Nov. 14, 1961   G. F. VANDERSCHMIDT   3,009,096
METHOD AND APPARATUS FOR TESTING GASES
Filed Oct. 11, 1957   2 Sheets-Sheet 1

Nov. 14, 1961   G. F. VANDERSCHMIDT   3,009,096
METHOD AND APPARATUS FOR TESTING GASES
Filed Oct. 11, 1957   2 Sheets-Sheet 2

United States Patent Office 3,009,096
Patented Nov. 14, 1961

3,009,096
METHOD AND APPARATUS FOR TESTING GASES
George F. Vanderschmidt, Belmont, Mass., assignor to National Research Corporation, Cambridge, Mass., a corporation of Massachusetts
Filed Oct. 11, 1957, Ser. No. 689,722
5 Claims. (Cl. 324—33)

This invention relates to the detection and measurement of gas. More specifically it relates to sensing traces of sample gas present in a carrier gas comprised essentially of helium.

An object of this invention is to devise a method utilizing ionization chamber detectors of detecting smaller trace concentrations of sample gases in combination with the carrier gas helium than are detectable utilizing ionization chamber methods heretofore known.

Another object of this invention is to provide a detector of the ionization type for detection of traces of sample gas present in helium which for a given intensity of ionizing source and a given sample gas concentration in the carrier gas helium provides a much higher significant output current than is possible to obtain using the same intensity of ionizing source and the same concentration of sample gas with methods heretofore known.

A further object of this invention is to produce an apparatus which will detect very small traces of gases each of which occurs in mixture with helium.

A still further object is to provide a basic apparatus which, with only simple adjustments in electrical circuitry, can detect a larger range of concentrations of a sample gas in helium than has before been possible with a single instrument.

Other objects of this invention will in part be obvious and will in part appear hereinafter.

The invention accordingly comprises the process involving the several steps and the relation and the order of one or more of such steps with respect to each of the others and the apparatus possessing the construction combination of elements and arrangement of parts which are exemplified in the following detailed description taken in connection with the accompanying drawings where:

The objects of this invention are realized by departing from the common method of ionization analysis of a mixture of sample gas with helium which involves producing ion current variations from the gas mixture substantially directly proportional to the cross-section for ionization and the amount of sample gas present in the mixture. Instead there is utilized the inhibiting effect that traces of sample gas have upon helium gas amplification which occurs when substantially pure helium is ionized under certain conditions.

Figure 1:
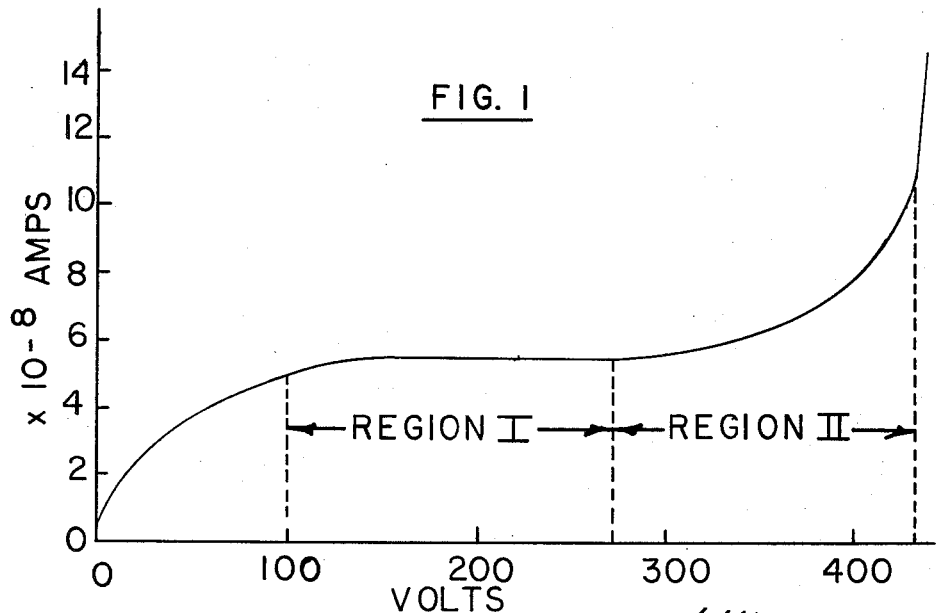
FIG. 1 is a graph indicating the current produced in an ion chamber in which gas is being ionized under steady conditions while the electrical potential of the ion collecting electrode is varied.

The method of gas analysis commonly used comprises ionizing the mixture of sample gas and helium by passing through the gas a steady flow of ionizing particles such as beta or alpha particles flowing from a radioactive source or a steady flow of electrons emanated from an energized heated filament and accelerated by an electrical field, electrically collecting the ions thus produced, compensating the ion current for background current attributable to the helium and for system variations, and measuring the resultant ion current. In the usual method, the electrical ion collection means comprises an electrode maintained at such a potential that the ion current does not vary substantially with moderate variations in the potential of the electrode but only with the total gas ionization area encountered which is dependent upon the density of the sample gas and the cross section for ionization of molecules of the gas. In this prior art method of operation ions are produced only by the ionizing action of the rays flowing from the source. The electrical field potential maintained is in region I indicated in FIG. 1 where there is plotted the variation in ion current with the potential applied to a given electrode serving as a collector in an ionization chamber in which helium is being ionized under otherwise fixed condition. For the given apparatus this potential range is between 100 and 250 volts.

Utilizing this common method, the minimum detectable concentrations of sample gas is, for example, on the order of .02 microgram of pentane per cc. He. The minimum detectable concentration for a given detector utilizing this method is prescribed by the noise level of the detector. Increases in concentration of sample gas are indicated by increases in resultant ion current.

Utilizing the new method and apparatus of this invention and without extensive experimentation, a concentration of pentane in helium as low as .002 microgram of pentane per cc. of helium can be detected, when the helium was at least 99% pure.

The new method of gas analysis of this invention is as follows. A mixture of sample gas and helium as carrier gas is ionized by a steady flow of ionizing particles. The resultant ions are subjected to such an electrical field that if substantially pure helium at the same conditions were being ionized the electrons freed by the ionization of helium atoms would be so accelerated that they would in turn ionize other helium atoms. (The condition thus maintained is known in the art as gas amplification.) For the given conditions used in preparing FIG. 1, the potential of the electrode is maintained above 250 volts as indicated by region II in FIG. 1. The sample gas has an inhibiting effect on this gas amplification, and therefore the ion current produced by ionizing the mixture of sample gas and helium at the same conditions is lower than the ion current obtained when ionizing substantially pure helium. For concentrations below 1 microgram of pentane per cc. He (for instance) the decrease in ion current is substantially proportional to the concentration of pentane sample gas present in the helium. By measuring the ion current thus produced, the concentration of the sample gas in the helium is determinable. Increases in concentration of sample gas are indicated by decreases in resultant ion current.

Under gas amplification conditions (with a gas amplification of 10) the ion current variation produced by a given concentration of sample gas in helium is about 1000 times greater than that obtained when using the prior art method. Larger currents make measuring easier and permit detection of smaller quantities of sample gas.

It has long been realized that gases when initially ionized by some source and subjected to certain minimum electrical fields will ionize further due to the collision of electrons freed by the initial ionizations with molecules of un-ionized gas. It has further been long recognized that this gas amplification occurs with different electrical fields in different gases. The actual application of this general knowledge to a method of gas analysis depends upon conditions which must necessarily be imposed in order to achieve the substantial change in gas amplification of a carrier gas obtained with a change in sample gas.

Figure 2:
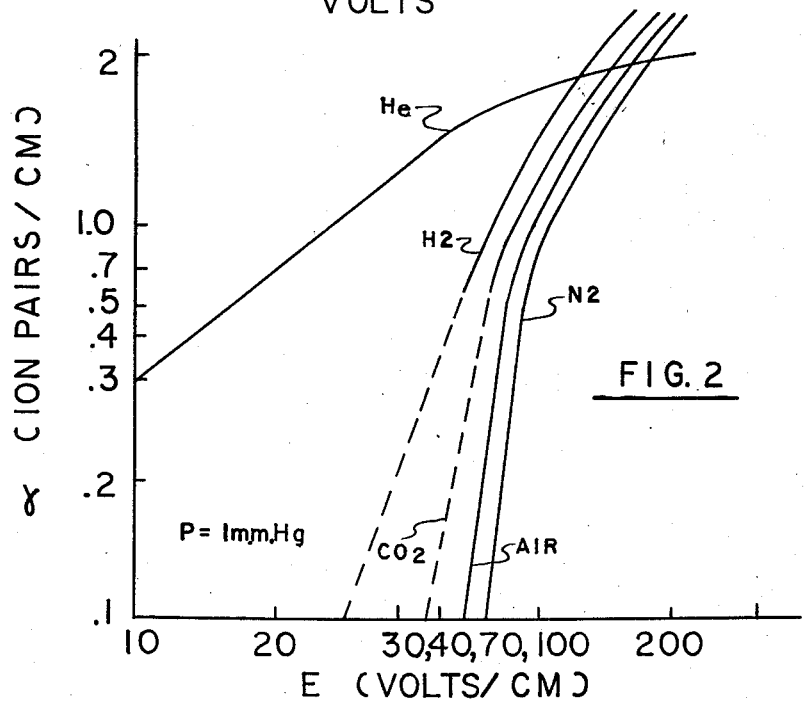
FIG. 2 is a graph indicating the amplification characteristic of various gases at different field strengths.

The first necessary condition is that helium be used as the carrier gas. Commercially obtainable gases experience gas amplification at conditions which are nearly the same. Ionization of mixtures of any two of the gases under amplification conditions will produce ionization currents which do not vary greatly in magnitude from ionization of one of the gases in the pure form under the same pressure and electrical conditions. Helium, on the other hand, experiences gas amplification when being ionized and subjected to a much smaller field strength than other gases as is indicated in FIG. 2 where the parameter $\alpha$, the number of ion pairs produced by a single electron passing 1 cm. in the direction of the electric field, is plotted against the electric field strength for various gases at the same pressure. A value of $E/p$ (field strength in volts/cm. divided by pressure in mm. Hg) greater than 1 must exist somewhere within a chamber whose overall dimensions are less than about 50 cm. for any appreciable gas amplification to exist in He.

A further advantage obtained using helium is elimination of the danger of damaging the ionization chamber by introducing unexpected gas. If a gas other than helium were used as carrier gas, it would be possible to either increase or decrease the amplification occurring. If amplification is permitted to increase uncontrolled, eventually a breakdown of the gas being ionized will occur resulting in the gas becoming electrically conductive. A large current will flow causing damage to the instrument. Thus, addition of an unexpected gas which has a tendency to "amplify" greater than that of the carrier gas presents a danger to the instrument. Since helium is the most ready producer of amplification at low field strengths, additions of gas other than helium can produce only a decrease in the amplification. Thus, helium is safest to use as carrier gas.

The second condition necessary to be obtained to achieve a practical method of analysis is that the electrical field be maintained virtually constant. The gas amplification effect used in this invention occurs only where initial ionization frees electrons which cause further ionization as is indicated by region II, FIG. 1. An examination of the curve of ion current plotted against field change indicates the great current variation that would be present for a small variation in the field.

The tolerable variation of the electrical field depends upon the desired sensitivity of the instrument. The tolerable voltage variation for a given instrument is best determined by experiment after other operating conditions are established, e.g., after establishing the pressure at which concentrations are to be detected, and the specific electrode configuration and electrical potential are selected.

One of the contributions of this invention is the attainment of linearity between changes in ion current with changes in concentration of sample gas in a portion of the range of this instrument. For example, in utilizing helium at atmospheric pressure, operating with a gas amplification of 10 (maintaining the electrode which was a #16 round wire at a potential of 475 volts in relation to cylindrical walls concentrically surrounding the electrode at a distance of 15 cm.), linearity was observed in the range of concentrations of pentane in helium up to 1 microgram pentane per cc. He.

Figure 3:
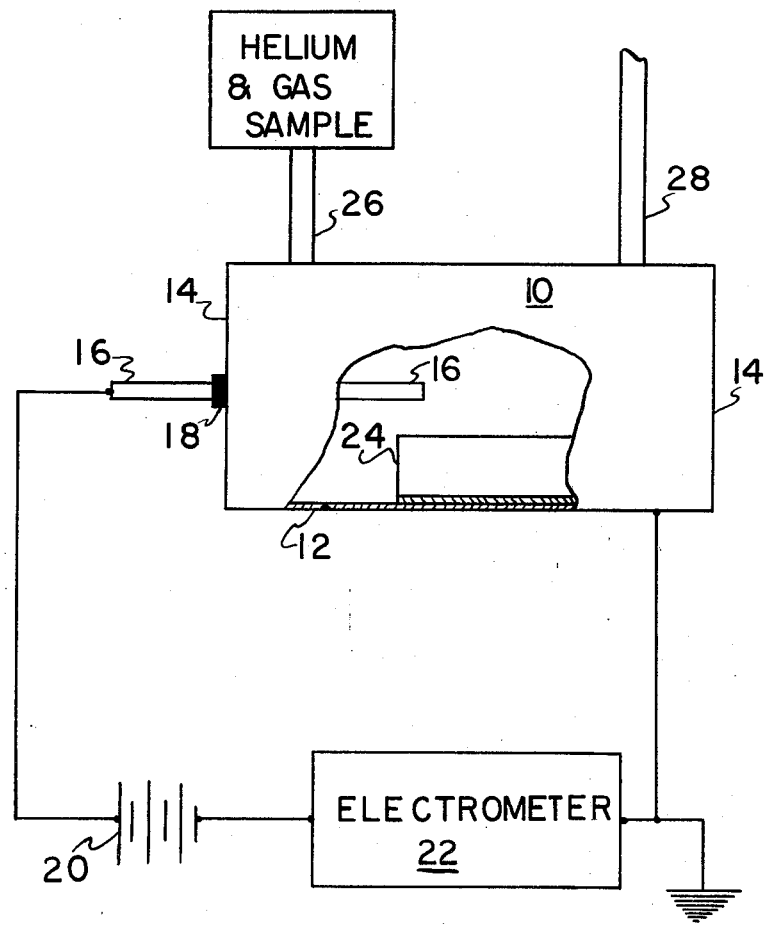
FIG. 3 is a diagrammatic schematic presentation of one preferred embodiment of this invention.

Referring now to FIG. 3, preferred embodiment of the apparatus of the invention will be described illustrating in more specific detail the invention.

In FIG. 3 there is shown an ionization chamber 10 comprised of a gas tight cylindrical wall 12 and two gas tight ends 14. At one end a small diameter electrode 16 protrudes into the chamber from outside, being electrically insulated from the end of the chamber by insulation 18. The electrode is energized by a constant voltage source 20. Provided in circuit with the electrode 16 and the voltage source 20 is an electrometer 22 so positioned that decrease in the electric current flowing from the electrode 10 is indicated by an increase in the scale reading of the electrometer.

At the wall of the chamber a foil containing radioactive material is placed so that electrons or other particles emitted from the foil traverse at least a portion of the volume of the chamber 10.

Near the ends of the chamber there are provided gas passage tubes 26 and 28. The operation of the apparatus is as follows:

A mixture of helium as carrier gas and a small concentration of sample gas is introduced into the chamber 10 through gas passage 26. The gas mixture traverses the chamber 10 and passes out through gas passage 28, there being maintained steady gas flow conditions. While the gas is in the chamber, it is exposed to a flow of ionizing particles being emitted from radioactive material 24. Initial ionization of the gas mixture occurs as the electrons from the electron gun 24 traverse the gas. Electrode 16 is maintained at a positive potential, hence the electrons freed by the initial ionization and the electrons emitted from the foil are drawn toward the electrode 16. The potential is maintained so that at least some of the electrons produce further ionization of the gas mixture as they approach the electrode 16. The flow of current through the electrode 16 and the voltage source 20 is measured by electrometer 22. The electrometer 22 is preferably adjusted to read zero when pure helium at the same pressure as the mixture is flowed through the chamber 10, hence the current produced by the ionization of the mixture of gas will be less than the "zero" current, the difference being indicated by a positive reading on the electrometer which is indicative of the concentration of the sample gas in helium.

In operable embodiments of this invention, the ionization chamber may be of any size or shape, though for economy and ease of handling the cylindrical configuration is preferred. A plurality of electrodes 16 may be utilized or the walls of the chamber may serve as the electron collectors. In order to achieve a high electrical field utilizing a small potential source, it is preferable, however, to utilize an electrode which approaches being a point source of potential. A small diameter wire is therefore preferred. The radioactive material 24 can be any suitable emanator of ionizing particles. Alternatively, a hot filament and electric field accelerator may serve as the source of ionizing particles at low pressures. At high pressure positive ion bombardment of the filament is damaging. For that reason, where gas at above about $10^{-3}$ mm. Hg pressure is used, it is preferable to utilize a source of electrons which is not damaged by positive ion bombardment. One such suitable electron source is a tritium foil such as that described in copending application of Jonathan Roehrig, Serial No. 687,800, filed October 2, 1957.

Any suitable current measuring means may be utilized as the electrometer, and it may be so calibrated so as to read actual concentrations of a given gas.

It is possible to utilize the specific apparatus shown in the above application of Roehrig with simple changes. By providing a reversible current measuring means, the detection of trace quantities of sample gas in helium and the detection of the concentration described in Roehrig's application are possible utilizing the same apparatus.

What is claimed is:

1. A method of detecting traces of a gas comprising chromatographically separating said trace of gas and forming a binary combination of such trace of gas with substantial quantities of helium and thereafter subjecting said binary gas combination to irradiation of ionizing particles and accelerating the electrons evolved from ionizations produced from said irradiation to such a degree as to produce at least some secondary ionizations by said accelerated evolved electrons and thereafter collecting all of said ions produced and measuring the rate of collection, thereby obtaining an indication of the concentration of the trace of gas in the helium.

2. An apparatus for analyzing gas comprising a chromatographic separation means, means to maintain traces of gas evolved from said chromatographic means in binary combinations with helium, chamber means, means to flow the binary gas combinations through the chamber, and means to irradiate the binary gas combinations with beta particles, said means comprising tritium impregnated in a metal with which tritium is substantially occluded and an ion collection means comprising a small diameter wire serving to collect the electrons located substantially centrally in said chamber, the walls of the chamber serving as collector for the positive ions and means to create an electrical potential between said electrodes of such a magnitude that the electrons flowing from initial ionizations in said chamber are so accelerated that they cause at least some secondary ionizations of the binary gas combination.

3. A wide range gas sensing apparatus comprising in combination a chamber for containing helium and sample gas, an electrode located in said chamber, electrical potential means with circuitry provided to provide a potential difference between the electrode and the chamber walls, means to ionize gas in said chamber, and means to measure the current flowing in the circuitry between the electrode and the chamber walls, said electrical potential being variable such that in one setting only the ions formed by the ionizing means are collected, and in another setting being sufficient to accelerate the electrons produced by ionization sufficient to cause at least some secondary ionization so as to provide a means of detecting gas in a single chamber by the method of gas amplification dampening and by the method of determining the nature of the gas by ascertaining the summation of the ionizing area of the gas by irradiating with ionizing particles.

4. A method of quantitatively measuring traces of gas in combination with other gases, said method comprising subjecting the other gases to such conditions comprising irradiation with beta particles emanated from tritium that the gas amplification ionization region is attained producing an abundancy of ions and thereafter introducing said trace of gas in the other gases and observing the change in the production of ions.

5. A method of quantitatively measuring traces of gas in combination with another gas, said method comprising subjecting the other gas to radioactive radiation while under sufficiently high applied voltage that the gas amplification ionization region is attained, thereby producing an abundancy of ions while such other gas is maintained at a pressure near atmospheric, the applied voltage being sufficiently low that a continuous discharge is not obtained, and thereafter introducing said trace of gas into the other gas and measuring the change in the production of ions while the applied voltage remains essentially constant.

References Cited in the file of this patent

UNITED STATES PATENTS

| | | |
|---|---|---|
| 2,531,144 | Manley | Nov. 21, 1950 |
| 2,550,498 | Rice | Apr. 24, 1951 |
| 2,770,772 | Foulkes et al. | Nov. 13, 1956 |